(12) United States Patent
Taillandier

(10) Patent No.: US 6,354,348 B1
(45) Date of Patent: Mar. 12, 2002

(54) VALVE FOR TIRE AND RIM ASSEMBLY EQUIPPED WITH A PNEUMATIC SUPPORT MEMBRANE

(75) Inventor: Bernard Taillandier, Cébazat (FR)

(73) Assignee: Compagnie Generale des Etablissements Michelin - Michelin & Cie

( * ) Notice: Subject to any disclaimer, the term of this patent is extended or adjusted under 35 U.S.C. 154(b) by 0 days.

(21) Appl. No.: 09/405,985

(22) Filed: Sep. 27, 1999

Related U.S. Application Data

(63) Continuation of application No. PCT/EP98/01747, filed on Mar. 25, 1998.

(30) Foreign Application Priority Data

Apr. 2, 1997 (FR) .............................................. 97 04245

(51) Int. Cl.[7] .............. B60C 5/22; B60C 17/01; B60C 29/00
(52) U.S. Cl. ................ 152/342.1; 152/339.1; 152/429
(58) Field of Search .................... 152/339.1, 340.1, 152/341.1, 342.1, 429

(56) References Cited

U.S. PATENT DOCUMENTS

| 2,354,912 A | 8/1944 | Eger |
| 5,180,455 A | 1/1993 | Cheng |
| 5,479,976 A | 1/1996 | Cho |
| 5,538,061 A | 7/1996 | Blair |

FOREIGN PATENT DOCUMENTS

| DE | 3711785 A1 | 10/1988 |

*Primary Examiner*—Adrienne C. Johnstone
(74) *Attorney, Agent, or Firm*—Baker Botts L.L.P.

(57) ABSTRACT

A valve for a tire and rim assembly equipped with a pneumatic support membrane designed to be deployed when the pressure difference between the cavity of the membrane and that of the tire exceeds a given threshold, so that every operation of inflation or deflation preserves the integrity of the membrane while preventing any deflation of the tire cavity alone.

11 Claims, 3 Drawing Sheets

VALVE FOR TIRE AND RIM ASSEMBLY EQUIPPED WITH A PNEUMATIC SUPPORT MEMBRANE

This is a continuation of PCT/EP98/01747, filed Mar. 25, 1998.

BACKGROUND OF THE INVENTION

The object of the invention is a valve designed to be fixed in tight fashion in the rim of a wheel to provide the air supply of a tubeless tire mounted on said rim and, more particularly, a valve designed to equip tire and rim assemblies including a pneumatic support membrane.

Patent Application FR 96/14631 discloses a belted pneumatic membrane, made of reinforced rubber, supporting the tread of a tubeless tire in case of puncture of the latter. This membrane is designed to be arranged in the inside of the inner cavity defined by the tire and its rim and to be inflated to a pressure greater than that of the cavity of the tire. Under these conditions of normal use, the membrane has a maximum running radius smaller than the loaded radius of the tire used at its recommended pressure. In case of puncture of the tire, when the pressure difference between the cavity of the membrane and that of the tire exceeds a given value, the membrane belt ruptures, the membrane is deployed into the assembly of the tire cavity and thus permits the tire to continue running under acceptable conditions.

Such a running tire, rim and support membrane assembly may include two separate inflation and deflation valves. This is the usual solution proposed for example by U.S. Pat. No. 5,538,061. However, this solution has two disadvantages. First of all, the presence of two valves is undesirable because this necessitates a second hole punched through the rim. On the other hand, these two valves do not protect the user from a handling error during a tire maintenance operation that might accidentally be caused by the pressure difference between the two cavities beyond the threshold value of rupture of the membrane reinforcement.

The subject of the invention is a valve that solves this problem.

SUMMARY OF THE INVENTION

The valve according to the invention is designed to equip a tire and rim assembly defining a first tight inner cavity, the said assembly comprising a pneumatic support membrane defining a second tight inner cavity arranged in the first tight inner cavity. This valve comprises:

a first passage connecting the second inner cavity and the open air;

a second passage connecting the said first passage and the first inner cavity;

a tight pneumatic chamber connected to the second passage;

first means of closure of the connection between the first and the second passage, such that the said connection is closed when the pressure difference between the said first passage and the said chamber is below a first given threshold; and second means of closure of the connection between the pneumatic chamber and the second passage, such that the said connection is closed when the pressure in the said second passage is below a second given threshold.

Preferentially, the value of the first threshold corresponds approximately to the pressure difference in normal operation between the first and second cavities, and the second threshold is approximately equal to the rated inflation pressure of the tire when cold.

This valve has the advantage of permitting use very close to that of conventional valves: There is only one single inflation orifice; at the time of inflation, it suffices to reach the pressure provided for the cavity of the membrane for the cavity of the tire also to be at the rated inflation pressure, the connection between the two passages then being in closed position.

Preferably, the first passage comprises a nonreturn valve isolating the second tight cavity, that of the pneumatic support membrane, from the connecting passage between the two passages of the valve.

This valve thus makes it possible to guarantee complete pneumatic independence between the two cavities. In case of puncture, only the pressure in the first cavity diminishes.

The valve according to the invention, in an advantageous embodiment, includes means for simultaneous exposure to the open air of the two supply passages of the two pneumatic cavities. Deflation, being simultaneous, does not risk causing rupture of the reinforcement of the support membrane.

DESCRIPTION OF THE DRAWINGS

An embodiment of the invention is now described with the aid of the accompanying drawing, wherein.

DESCRIPTION OF PREFERRED EMBODIMENTS

Figure 1A:
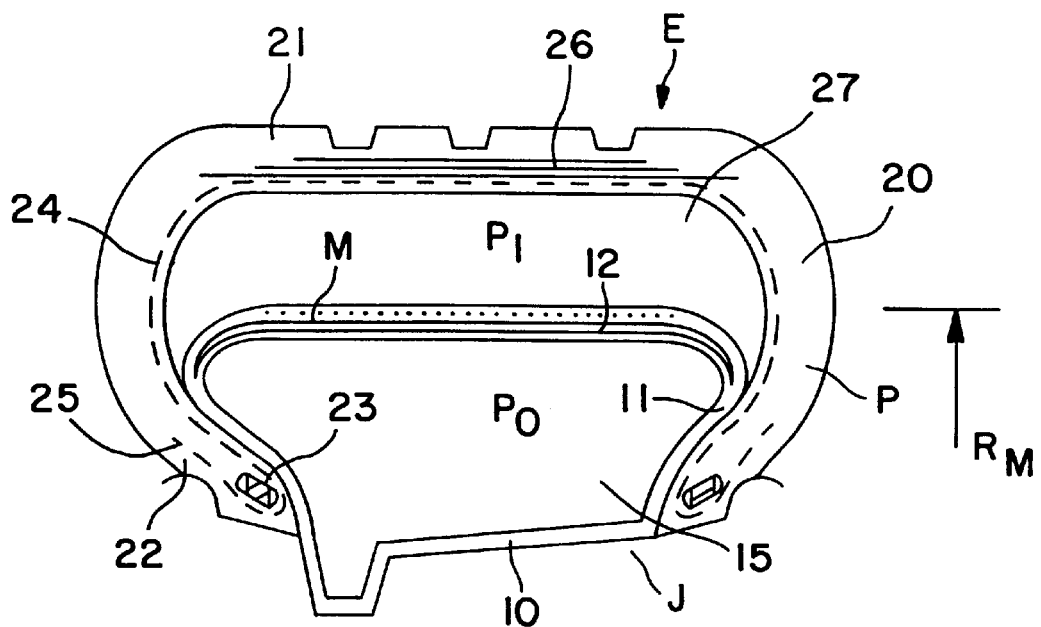
FIGS. 1A and 1B represent schematically the diametrically opposed meridian sections of a tire, rim and safety membrane assembly, when the tire is loaded and running under normal conditions.

FIG. 1 shows a running assembly E composed of a tire P, a mounting wheel rim J and a pneumatic support membrane M. The tire P is a universally known tire, with sidewalls 20 joined radially on the outside to a tread 21 and prolonged radially on the inside to form two beads 22, each bead being reinforced by at least one bead wire 23 about which there is anchored a radial carcass casing 24 to form turn ups 25. The carcass casing 24 is surmounted radially in the top by a top casing 26, composed of at least two plies of wires or metal cables parallel to one another in each ply and crossed by one ply after the next while making an angle, which may be between 5° and 45°, with the circumferential direction. The tire P is called tubeless, and inside contains a layer of a rubber mixture impermeable to inflation gases. The tire and rim assembly defines a first tight inner cavity 27.

The wheel rim J on which the tire P is mounted is a rim of known type.

Figure 1B:
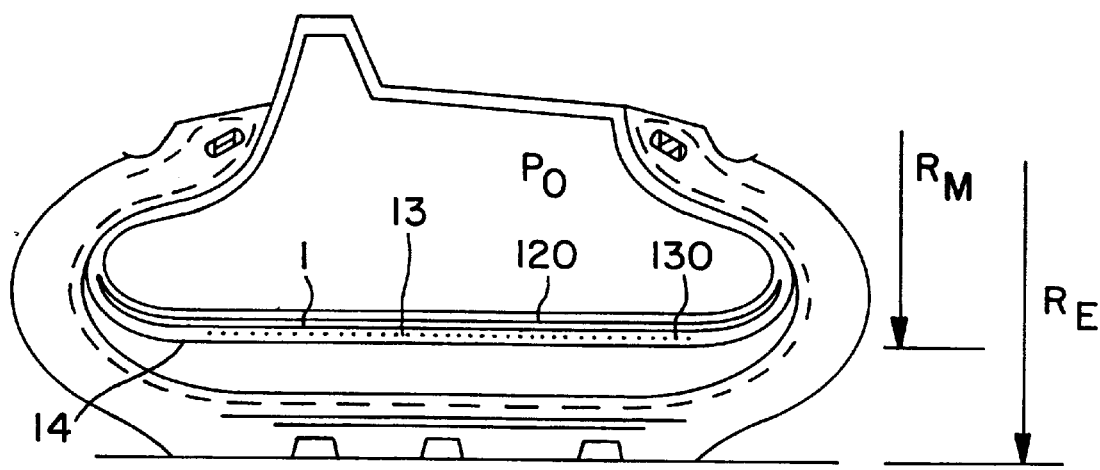

The pneumatic support membrane M defines a second tight cavity 15 in the inside of the first cavity 27. This membrane M is closed and reinforced at its top 1 by a top casing 12. The top casing, easily expandable, is associated with a reinforcing belt 13 composed for example of a ply 130 of cables oriented circumferentially. This ply 130 of circumferential cables provides the function of reinforcement of the membrane M, reinforcement, on the one hand, against the stresses due to centrifugal force and, on the other, against the stresses due to the pressure differential $p_0-p_i$, $p_0$ being the inflation pressure in the cavity 15 of the support membrane M, equal to $9.5 \cdot 10^5$ Pa, and $P_1$ being the pressure in the cavity 27 of the tire P, equal to $9.0 \cdot 10^5$ Pa. These inflation values are the rated values in the cold condition in the example selected. The reinforcing function permits the membrane M to preserve, under normal running conditions of the running assembly E, i.e., under load conditions, the recommended pressure and speed for the tire concerned, a radius $R_M$ which is practically constant and smaller than the loaded radius $R_E$ of the tire P (FIG. 1B representing the loaded part of the assembly under normal running conditions).

The membrane M is completed by the covering of the belt 13 by a rubber mixture layer 14 of small thickness. The sidewalls 11 of the membrane M preferably are grooved by radial recesses 110 which are prolonged the length of the wall of the membrane designed to come into contact with the rim J to permit easy inflation and deflation of the inner cavity of the tire starting from the valve of the invention.

Figure 2A:
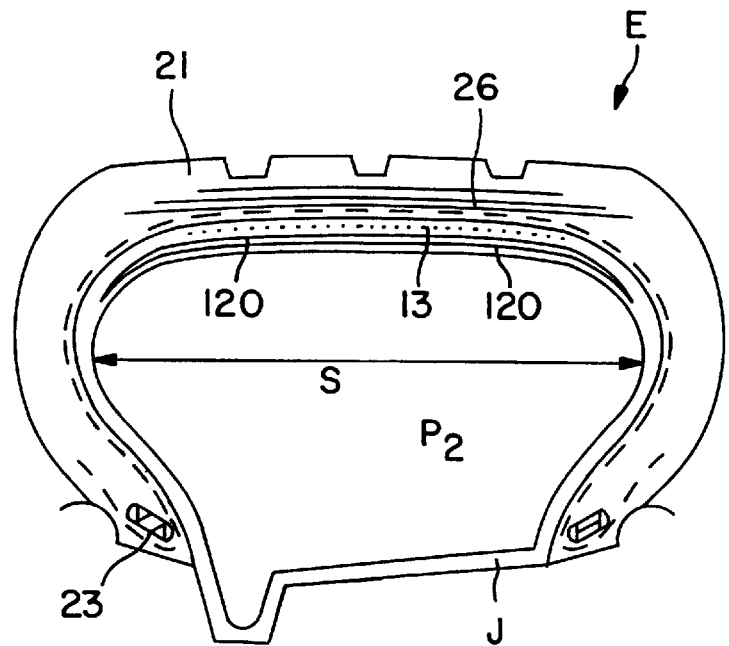
FIGS. 2A and 2B represent schematically, in the same manner as in FIG. 1, the meridian sections of the assembly subjected to running in damaged mode.
Figure 2B:
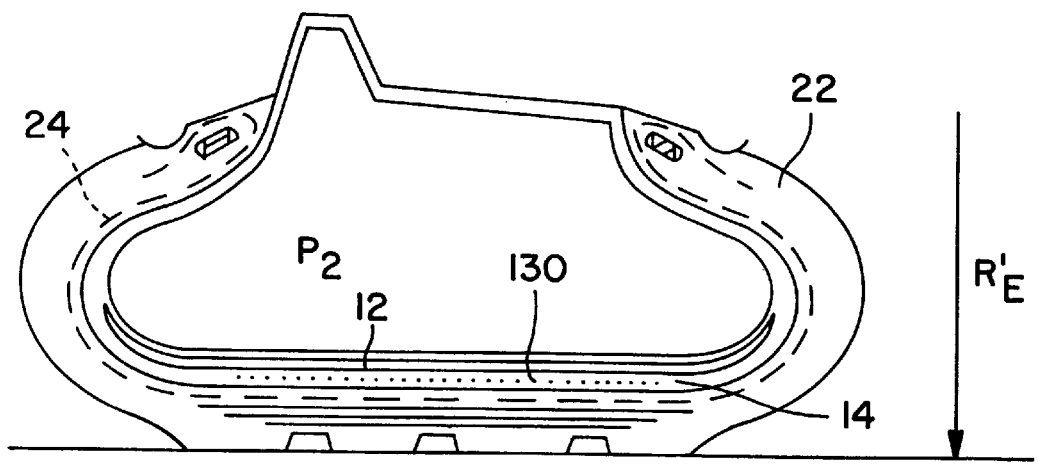

When the tire P loses inner pressure, slowly or suddenly, and regardless of the reason for this loss of pressure ($p_1$ decreases), the pressure differential $p_0-p_1$ increases until it becomes such that the cables of the ply 130 rupture and thus permit expansion of the support membrane M until complete occupation of the cavity 27 of the tire P (FIGS. 2A and 2B). Since the increase in volume results in a reduction of the initial inner pressure $p_0$ of the membrane M, the running assembly operates under a lower pressure $P_2$, leading to a loaded radius $R'_E$ in running in damaged mode less than the loaded radius $R_E$ in normal running (FIG. 1B). However, the radius $R'_E$ permits running at moderate speed until the next maintenance air without major damage to the tire P and without human intervention, maintenance air then making it possible to provide the necessary pressure supplement to obtain a radius very close to the radius $R_E$ and permit running under practically normal conditions, the speed of the vehicle having to be slightly reduced, however, because of the substantially greater heating of the assembly.

Figure 3:
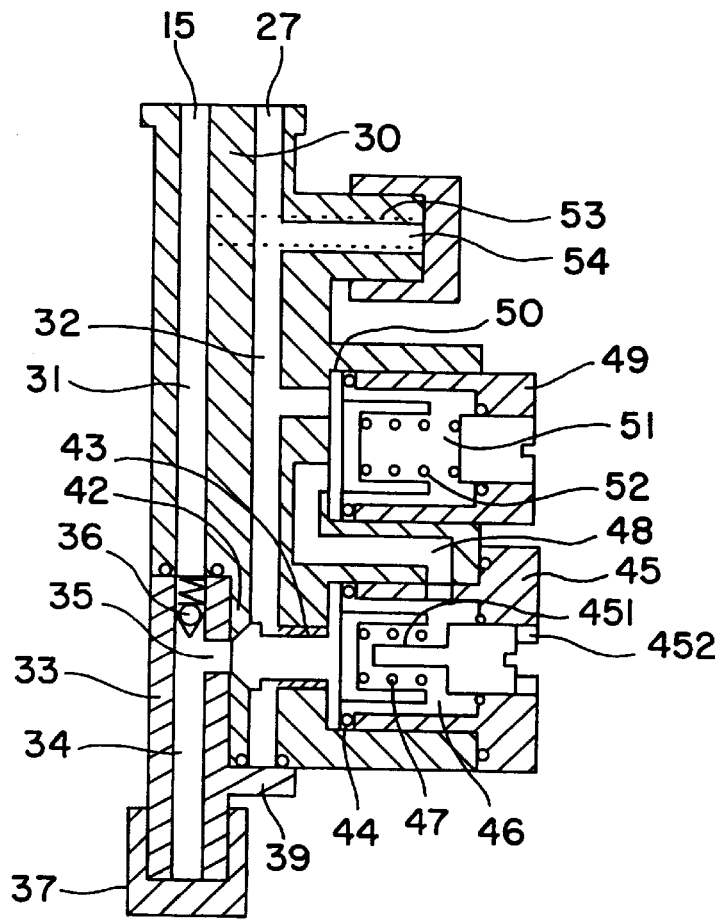
FIG. 3 is a longitudinal section of a valve according to the invention.

FIG. 3 shows in longitudinal section a valve 3 according to the invention, designed to equip an assembly E such as described above.

This valve 3 comprises a valve body 30 with a first passage 31 connecting the cavity 15 of the membrane M with the open air and a second passage 32 connecting the cavity 27 of the tire P with the open air. A part 33 is fixed to the valve body 30 on the side opening to the open air. Said part 33 comprises a fixed plug 39 sealing the second passage 32 and a passage 34 connected, on the one hand, to the end of the first passage 31 and, on the other hand, to a connection 35 with the second passage. The outlet to the open air of the passage 34 is sealed by a removable plug 37. The passage 34 comprises a conventional nonreturn valve 36 placed at the level of the connection with the first passage 31. This valve 36 makes it possible to completely isolate the second tight cavity 15, that of the pneumatic support membrane M. The part 33 is removable so as to simultaneously expose the two passages 31 and 32 to the open air and thus simultaneously deflate the two cavities 15 and 27.

The two passages 31 and 32 are connected by the connecting passage 35. The passage 35 has a seat 42 which may be sealed by the piston 43 fixed to the membrane 44 of a valve 45. This valve also comprises a chamber 46, a return spring 47 and an adjustable screw 451 for blocking the piston 43 in the position closing the connection 35. The chamber 46 is connected to the second passage by the connection 48, which may be closed by the membrane 50 of a valve 49. Said valve 49 also comprises a chamber 51 and a return spring 52 of adjustable force. The passages 31 and 32 have separate connections 53 and 54 with a pressure surveillance device, not shown.

Operation of the valve 3 is as follows. Upon inflation, the passage 34 is connected to a source of pressurized inflation gas. The nonreturn valve 36 opens and air penetrates into the passage 31 to inflate the cavity 15 of the support membrane M. In a first inflation, the pressure in the chamber 46 is atmospheric pressure and when the pressure difference between the first passage 31 and the chamber 46 exceeds a threshold of the order of $0.5 \cdot 10^5$ Pa, the piston 43 retracts and the connection 35 opens. Air penetrates into the passage 32 and inflates the inner cavity 27 of the tire P. When the pressure in the second passage 32 reaches a threshold of the order of $9.0 \cdot 10^5$ Pa, corresponding to the rated inflation pressure of the tire P, the membrane 50 of the valve 49 retracts and opens the connection between the chamber 46 and the second passage 32 through the intermediary of the passage 48. The pressure of the chamber 46 then becomes equal to the rated inflation pressure of the tire and to the pressure of the first passage 31. This pressure added to that of the spring 47 closes the connection 35 and inflation proceeds until the pressure $p_0$ is reached in the cavity 15.

Deflation of the cavity 15 is possible by actuating the valve 36, without modifying the pressure in the cavity of the tire P. It is possible to deflate the two cavities in simultaneous fashion by progressively withdrawing the part 33, which opens the two passages 31 and 32 to the open air.

Lastly, at the time of an accidental loss of inflation of the cavity 27 of the tire P, when the pressure becomes less than the pressure $p_1$, the spring 51 of the valve 49 seals the connection between the chamber 46 and the second passage 32 which completely isolates the chamber 46 and maintains its inner pressure at at least the value of the rated inflation pressure and keeps the connection 35 between the two passages closed. The cavity 15 is therefore also completely independent of the pressure in the tire cavity and when the difference $p_0-p_1$ becomes greater than a given threshold, of the order of $2.5 \cdot 10^5$ Pa, the reinforcement ruptures and the membrane M is deployed into the assembly of the cavity 27. In addition, the position of the nonreturn valve 36 guarantees the pneumatic independence of the cavity 15 in case of puncture of the tire P and deflation of the cavity 27. The running assembly of tire, rim and support membrane can then continue running under acceptable conditions. Since it is not guaranteed that the pressure in the pneumatic chamber 46 does not diminish progressively, it is provided that, by means of the screw 451, the piston 43 may be blocked manually in the position closing the seat 42 of the connection 35 to permit reinflation of the cavity 15, regardless of the pressure in this pneumatic chamber 46. The stop 452 makes it possible to return to the position of force of initial calibration.

The valve 3 thus makes it possible to prevent any error of handling of the running assembly E which a rupture of the reinforcement 13 and deployment of the membrane M would accidentally cause.

Figure 4:
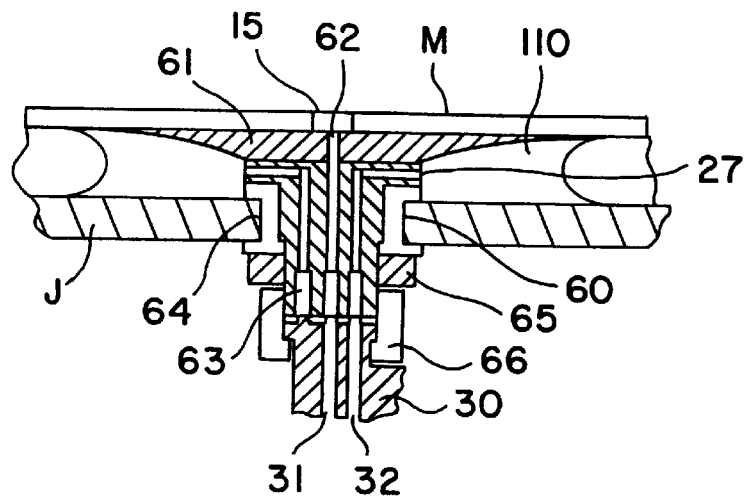
FIG. 4 shows the connection between the valve according to the invention, the rim and the support membrane.

FIG. 4 shows fixation of the valve 3 to the membrane M and to the rim J. This fixation comprises a valve base 61 fixed to the radially inner part of the membrane M prolonged radially inside by a part 60. The valve base 61 and the part 60 are traversed by a passage 62 connected, on the one hand, to the cavity 15 through the wall of the membrane M and, on the other, to the first passage 31. The part 60 is also traversed by a cylindrical passage 63 connected, on the one hand, to the cavity 27 of the tire and, on the other, to the second passage 32. The grooves 110 provide excellent communication between the cavity 27 of the tire and the passage 63. The passage 63 is cylindrical so as to permit good connection between the passage 32 regardless of the angular position of the valve body 30. The part 60 ensures tightness of the tire cavity 27 through the rim J by a conventional grommet 64 held in place by a screw nut 65. A connection 66 permits fixation of the valve body 30 to the part 60.

The valve according to the invention may alternatively be fixed to any other part of the rotary tire wheel hub assembly, provided that this part is pneumatically connected to the two cavities to be pressurized.

Lastly, the valve may be part of an inflation gauge and comprise a connection device that can be connected in removable fashion, at the time of a maintenance operation, for example to the part 60.

I claim:

1. A valve for a tire and rim assembly in which the tire has a first tight inner cavity and a pneumatic support membrane defining a second tight inner cavity arranged in the first tight inner cavity, the said valve comprising:

a first passage capable of connecting the second inner cavity and the open air;

a second passage capable of connecting the said first passage and the first inner cavity;

a tight pneumatic chamber connected to the second passage;

first means of closure of the connection between the first and the second passages, such that the said connection is closed when the pressure difference between the said first passage and the said chamber is below a first given threshold; and second means of closure of the connection between the pneumatic chamber and the second passage, such that the said connection is closed when the pressure in the said second passage is below a second given threshold.

2. A valve according to claim 1, in which the first threshold corresponds approximately to the pressure difference in normal operation between the first and the second cavities.

3. A valve according to claim 1, in which the second threshold is approximately equal to the rated inflation pressure of the tire when cold.

4. A valve according to claim 1, including means of adjustment of the said second threshold.

5. A valve according claim 1, in which the first means of closure of the connection between the first and the second passages comprises a sealing piston connected to an elastic membrane adjacent to the said pneumatic chamber.

6. A valve according to claim 1, including means for blocking in the closed position the first means of closure of the connection between the first and the second passages.

7. A valve according to claim 1, in which the first passage includes a nonreturn valve isolating the second tight cavity from the connection with the second passage.

8. A valve according to claim 1, comprising means for simultaneous exposure to the open air of the first and second passages.

9. A valve according to claim 1, in which the said second passage is connected to a pressure surveillance device.

10. A valve according to claim 9, in which the said first passage is connected to a pressure surveillance device.

11. A valve according to claim 1, comprising means for affixing the valve to the pneumatic support membrane.

* * * * *